United States Patent [19]

Steen

[11] 3,912,958
[45] Oct. 14, 1975

[54] FLUX-SWITCHED INDUCTOR ALTERNATOR

[75] Inventor: Donald B. Steen, Bowie, Md.

[73] Assignee: The United States of America as represented by the Secretary of the Navy, Washington, D.C.

[22] Filed: July 26, 1974

[21] Appl. No.: 492,314

[52] U.S. Cl. .............................. 310/168; 310/267
[51] Int. Cl.² ...................................... H02K 21/38
[58] Field of Search .............. 310/68 R, 168–170, 310/112, 114, 126, 267

[56] References Cited
UNITED STATES PATENTS

| | | | |
|---|---|---|---|
| 437,501 | 9/1890 | Mordey | 310/168 |
| 588,602 | 8/1897 | Rice | 310/168 |
| 1,058,244 | 4/1913 | Le Pontois | 310/168 |
| 2,108,662 | 2/1938 | Fisher | 310/168 |
| 2,519,097 | 8/1950 | Allen | 310/168 |
| 3,217,194 | 11/1965 | Terry et al. | 310/68 X |
| 3,321,652 | 5/1967 | Opel | 310/168 |
| 3,389,281 | 6/1968 | Ellis | 310/168 |

Primary Examiner—Donovan F. Duggan
Attorney, Agent, or Firm—R. S. Sciascia; Q. E. Hodges

[57] ABSTRACT

An inductor alternator for use in marine propulsion systems has a plurality of laminated stator bars arranged axially around a solid ferromagnetic rotor. The bars are magnetically connected at one end to a ring through which the rotor extends forming a narrow annular air gap therebetween. The free end of each stator bar is provided with a projection extending radially inward toward the rotor axis. Solenoidal output coils are wound about each stator bar and a stationary d-c field coil surrounds the rotor in close proximity thereto.

5 Claims, 6 Drawing Figures

FLUX-SWITCHED INDUCTOR ALTERNATOR

The invention described herein may be manufactured and used by or for the Government of the United States of America for governmental purposes without the payment of any royalties thereon or therefor.

BACKGROUND OF THE INVENTION

This invention relates to rotating electric machines and more particularly to an improved inductor alternator for generating an a-c voltage output.

An inductor type of a-c generator possesses certain advantages over other forms of generators. Since there are no rotating field or armature coils, slip rings, brushes and associated connections common to all machines having rotating windings may be entirely eliminated. This feature, coupled with the typical solid construction of the machine rotor, makes the inductor generator particularly adaptable to high rotational speed applications. In its most usual form, the inductor generator type machine is provided with two axially spaced stator laminations wound with a common a-c output winding. A solenoidal d-c field winding is positioned between the two stator laminations to pole the rotor north-south along its length. As the rotor turns, the stator laminations alternately experience a peak-to-zero flux variation and, consequently, a sinusoidally varying voltage is induced in the common a-c output winding. In such machines, the area of the common output winding is considerably larger than the effective voltage inducing pole area of the stator lamination, resulting in comparatively high ohmic losses and less than maximum flux utilization. Typically, the stator laminations of prior art machines are formed of costly complex shaped stampings and the field exitation coil is of relatively large diameter which requires long lengths of copper wire and results in wastage of considerable space within the machine.

SUMMARY OF THE INVENTION

In accordance with the present invention, an inductor alternator is provided with a solid cylindrical iron rotor having at least one radially toothed portion. The stator is formed of a plurality of simply fabricated laminated bars arranged concentrically of the rotor axis in oppositely disposed pairs. The stator bars are each provided with inwardly extending radial projections confronting each toothed portion of the rotor. An elongated solenoidal field coil is arranged concentrically of the rotor and in close proximity thereto.

In one form, each pair of oppositely disposed stator bars is magnetically connected to an annular ring concentrically arranged of the rotor axis in the annular space between the field coil and the laminated stator bars. Each annular ring is wound radially about its cross-section with a plurality of flat conductor torroidal output coils. The output leads from each coil are brought out radially between the stator bars and connected to buss bars. As the rotor spins, the flux in each annular ring switches direction, causing an alternating output voltage to be induced in the power output coils. By appropriately shaping the teeth, output voltage can be made substantially sinusoidal.

The use of toroidal output coils in the present invention advantageously results in minimum winding length and, consequently, low ohmic losses. In addition, flux leakage is minimized inasmuch as a toroidal has substantially no flux leakage. Similarly, the solenoidal field coil has a minimum diameter to reduce ohmic losses and because of its long axial length provides better flux coupling to the rotor. The components of the inductor alternator are compactly arranged to significantly reduce wasted space within the machine, consistently with the requirements of cooling.

OBJECTS OF THE INVENTION

It is therefore an object of the present invention to minimize the ohmic losses in both the field and stator windings of an inductor alternator machine.

Another object of the invention is to minimize the flux leakage characteristics of an inductor alternator machine by using solenoidal and toroidal windings.

A further object of the invention is to simplify the design of the field and output coils of an inductor alternator machine for economy of manufacture and ease of replacement or rewiring for different current and voltage ratings.

Still another object of the present invention is to simplify the design of the stator laminations in an inductor alternator machine.

Yet another object of the invention is to reduce wasted space in an inductor alternator machine by a compact arrangement of the machine components.

Other objects, advantages and features related to structural details and novel combinations and arrangements of the invention which will appear from a reading of the following detailed description when considered in conjunction with the accompanying drawings.

DETAILED DESCRIPTION OF A PREFERRED EMBODIMENT

Figure 1:
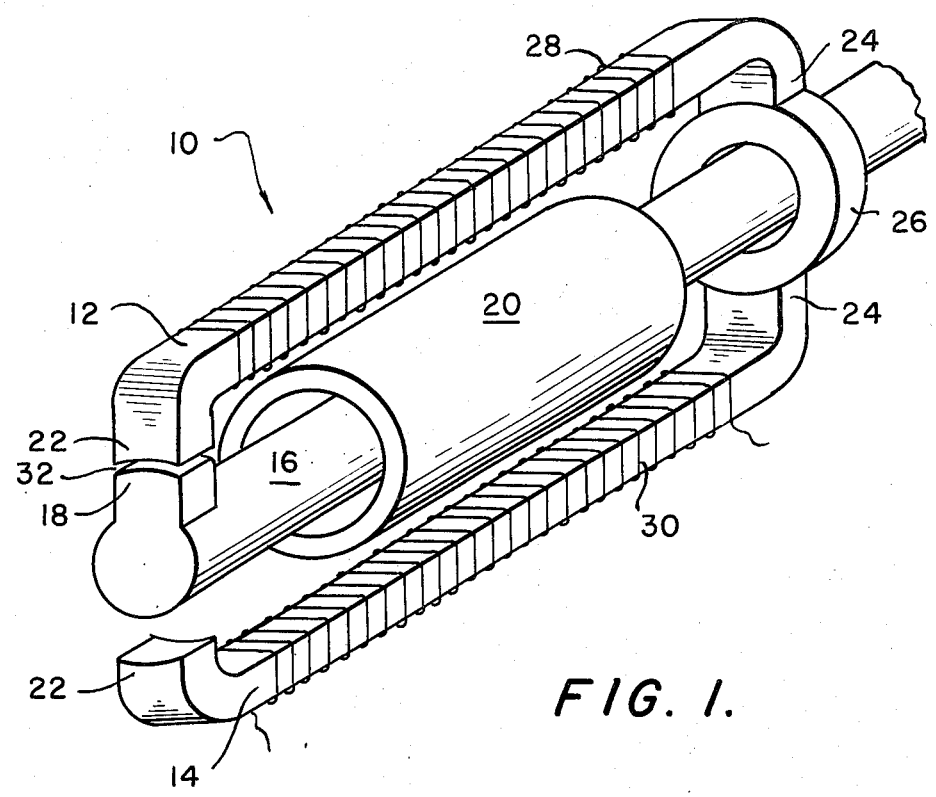
FIG. 1 is a diagrammatic view in perspective of one embodiment of the inductor alternator of the present invention.

Referring now in detail to the drawings wherein like reference numerals represent like parts throughout the several views, there is illustrated in FIG. 1 an inductor alternator 10 embodying the principles and novel features of the present invention. A pair of generally U-shaped laminated stator bars 12,14 are oppositely disposed about the axis of a solid ferromagnetic rotor 16 having a tooth 18 projecting radially from one end thereof. The other end of the rotor 16 is connected to the output of a prime mover (not shown) which may be the output shaft of a gas turbine engine. An elongated solenoidally wound d-c field coil 20 surrounds the rotor 16 in close proximity thereto and intermediately of its length. Each stator bar is provided with projections 22,24, i.e. the free ends of the U, extending radially inward at the ends thereof. The projections 24 are magnetically connected to a ferromagnetic flux ring 26 through which the rotor 16 extends. The annular clearance between the rotor 16 and ring 26 is small to minimize the reluctance of the flux path therebetween. Solenoidal output coils 28,30 are wound about each stator bar 12,14 intermediately of its ends.

In the rotor position shown in FIG. 1, the flux generated by the field coil 20 flows through the rotor 16, across a narrow annular clearance into the magnetic flux ring 26, through the stator bar 12, across the air gap 32 and hence through the radial tooth 18 to the rotor 16 to complete the magnetic path. As the rotor 16 spins about its axis, the tooth 18 alternately confronts the projection 22 of each stator bar 12,14 causing a zero-to-peak flux variation in the bars thereby alternately inducing a voltage in the power output coils 28,30 respectively.

Figure 2:
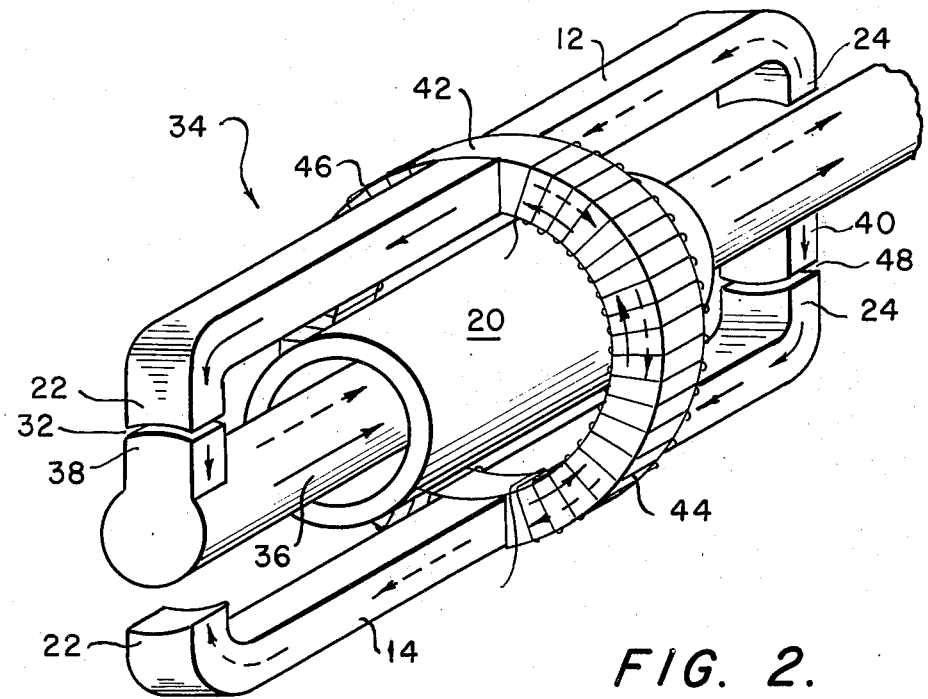
FIG. 2 is a diagrammatic view in perspective of an embodiment of the flux-switched inductor alternator of the present invention.

In FIG. 2, a flux-switched inductor alternator in accordance with the invention is designated generally by reference numeral 34. The rotor 36 is provided with a pair of axially spaced radial teeth 38,40 oppositely disposed on the rotor periphery. An annular magnetic flux output ring 42, disposed on a common axis with the rotor 36, magnetically connects the stator bars 12,14 intermediately of their length. Toroidal output coils 44,46 are wound about the output ring 42. With the rotor positioned as shown in FIG. 2, the flux generated by solenoidal field coil 20 flows through the machine in the direction indicated by the solid arrows. The dotted arrows show the direction of flux flow when the rotor 36 is positioned 180° from the position shown in FIG. 2. As the rotor 36 spins, the flux in the annular ring 42 switches direction thus inducing a substantially sinusoidal output voltage in the output coils 44,46. It should be noted that the stator bars 12,14 experience a zero-to-peak flux variation whereas the annular ring 42 experiences an alternating peak-to-peak flux variation.

Figure 3:
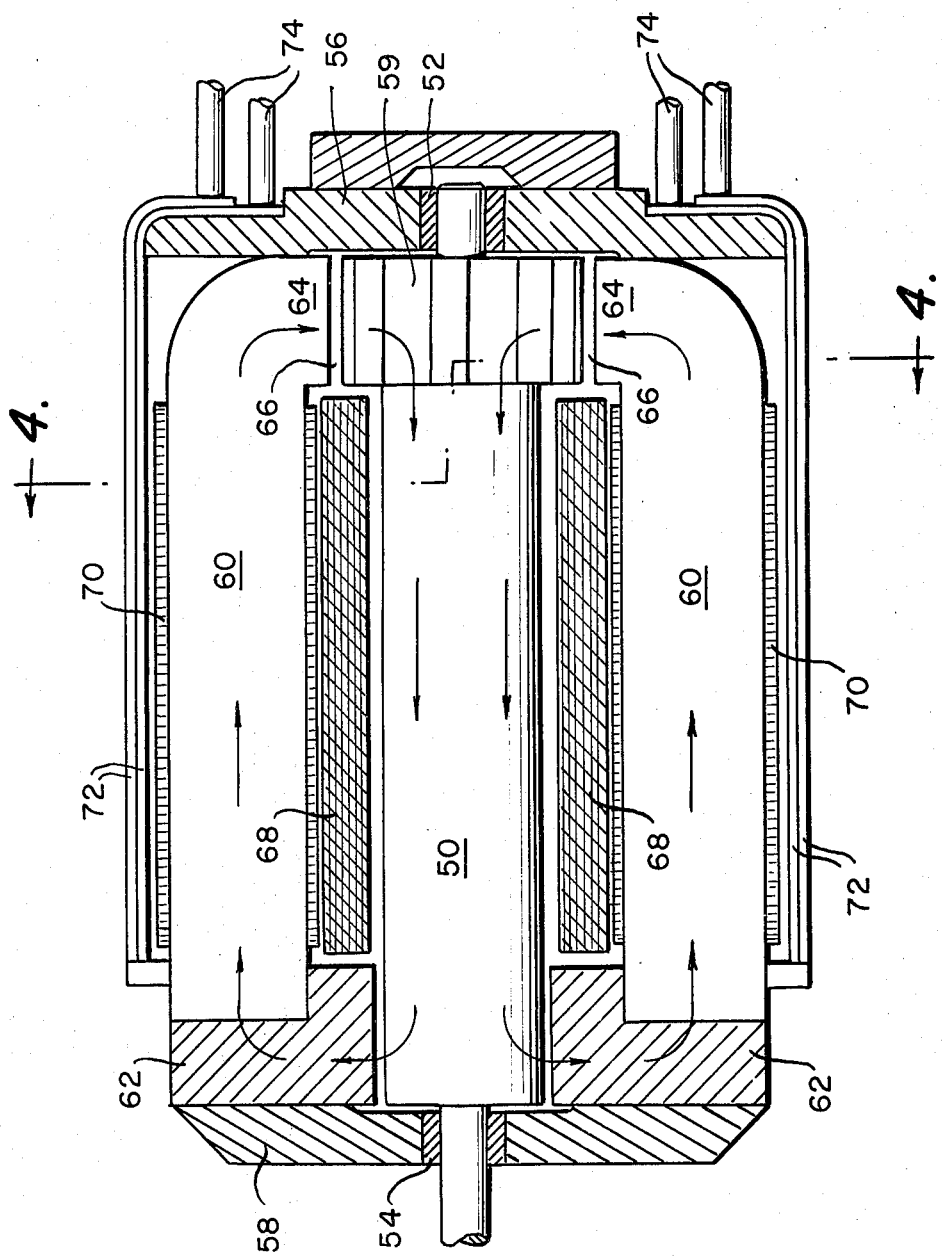
FIG. 3 is a side elevation view in cross-section of a practical embodiment of the inductor alternator of FIG. 1.
Figure 4:
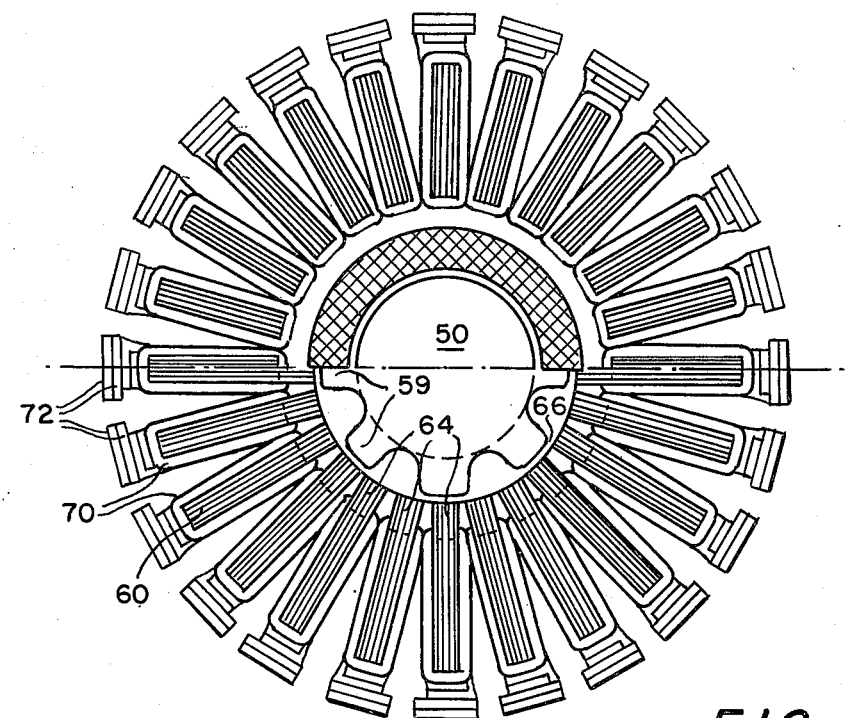
FIG. 4 is a cross-section view of the inductor alternator of FIG. 3 through section 4–4′.

FIGS. 3 and 4 illustrate a particular embodiment of the inductor alternator of the present invention constructed in accordance with the principles shown diagrammatically in FIG. 1. In the machine of FIG. 3, a cylindrical rotor 50 is rotatably journalled in bearings 52,54 mounted in end plates 56,58 respectively. One end of rotor 50 is provided with a set of eight radial teeth 59 equispaced about the periphery of the rotor. As best shown in FIG. 4, twenty-four substantially identical laminated stator bars 60 are concentrically arranged in equispaced relation about the rotor axis. Each laminated stator bar 60 is magnetically and mechanically connected to a ferromagnetic flux ring 62 which supports the bars 60 and forms a part of the magnetic flux path. The radial projections 64 on the stator bars 60 are arranged to successively confront the rotor teeth 59 across a narrow air gap 66 as the rotor 50 rotates about its axis.

A solenoidally wound d-c field coil 68 surrounds the intermediate portion of the rotor 50 in close proximity thereto and, when energized, generates a magnetic flux along the path shown by the arrows in FIG. 3. This flux induces a zero-to-peak output voltage in the solenoidal output coils 70 wound about the stator bars 60. The coils 70 are formed of flat copper strip and are provided with output leads (not shown) electrically connected to buss bars 72 extending longitudinally at equispaced locations around the periphery of the machine.

Each buss bar 72 is connected to an output cable 74 located at one end of the machine. It should be particularly noted that the inductor alternator machine of FIGS. 3 and 4 provides a very compact arrangement of components to minimize the space requirement of the machine. Both the field coil 68 and the output coils 70 are of minimum dimension so as to significantly reduce the ohmic losses in the windings thereby enhancing the output power of the machine. In addition, the magnetic forces across the air gaps 66 are radial thereby substantially eliminating axial forces on the bearings 52,54 caused by the magnetic field. Obviously, within the scope of the present invention, the number of rotor teeth 59 and stator bars 60 may vary and may be odd or even.

Figure 6:
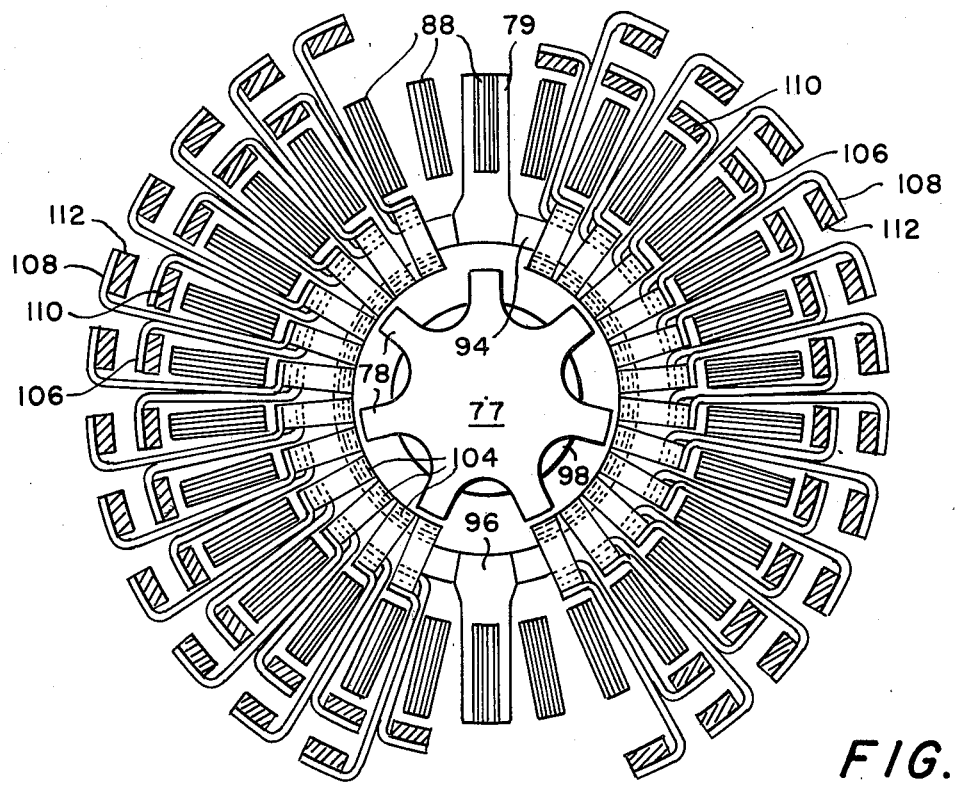
FIG. 6 is a cross-section view of the flux-switched inductor alternator of FIG. 5 through section 6–6′.
Figure 5:
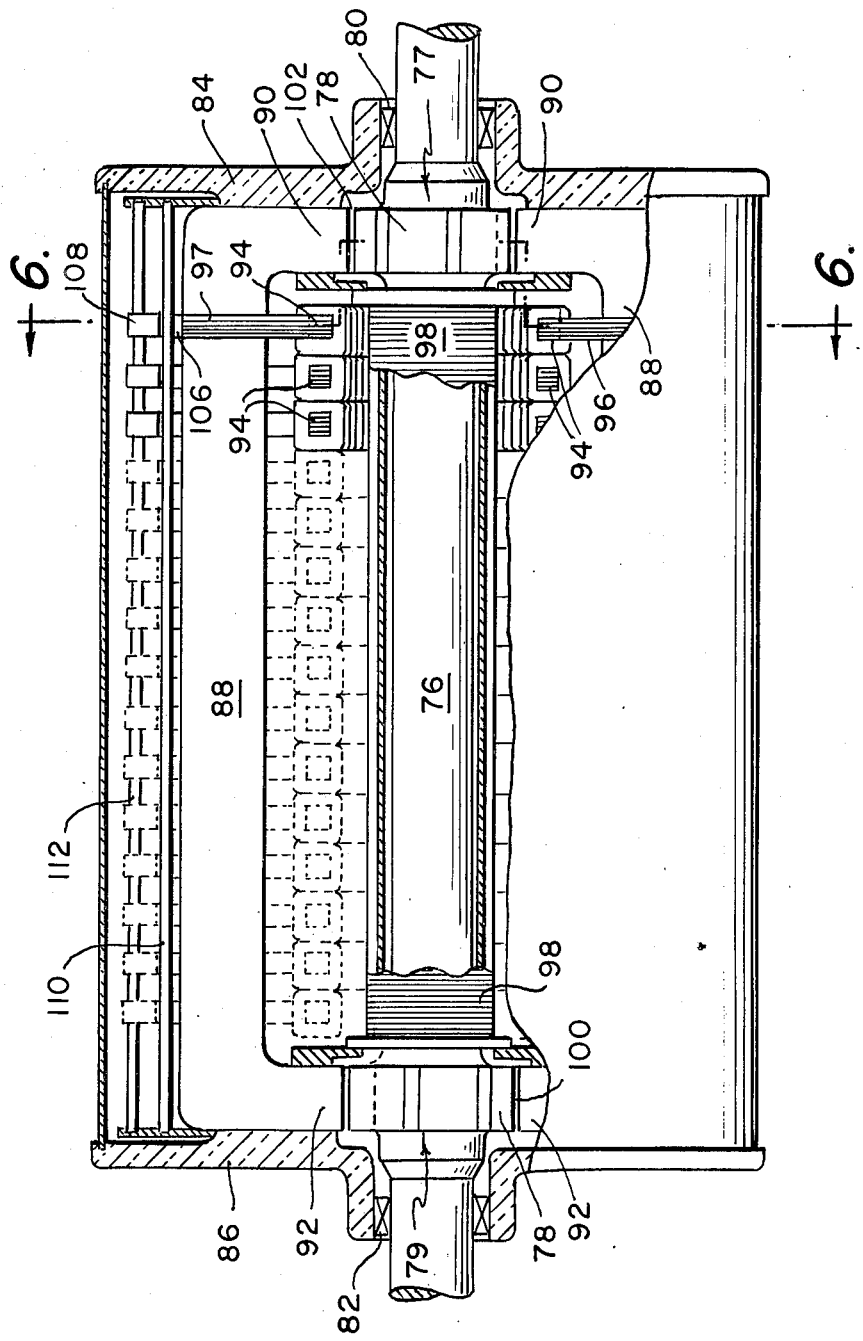
FIG. 5 is a side elevation view partly in section of a practical embodiment of the flux-switched inductor alternator of FIG. 2.

FIGS. 5 and 6 illustrate another embodiment of the invention constructed in accordance with the principles shown diagrammatically in FIG. 2. For convenience, portions of the machine unnecessary to the description herein, are shown in phantom. A cylindrical rotor 76 is provided with two axially spaced sets of teeth 77,79 each set having seven radial teeth 78. The teeth 78 are arranged such that each tooth of set 77 has a corresponding tooth of set 79 spaced 180° therefrom around the rotor circumference. Each end of the rotor 76 is journalled in bearings 80,82 centrally mounted in end plates 84,86 respectively. Thirty generally U-shaped laminated stator bars 88 are equally spaced concentrically about the machine axis. The legs of the U-shaped bars 88 form the projections 90,92 confronting the two sets of rotor teeth 77,79.

Each pair of oppositely disposed stator bars 88 is magnetically connected to one of fifteen ferromagnetic flux annular rings 94 of square cross-section by a pair of laminated ears 96,97. The annular rings 94 are concentrically disposed about the rotor axis in the annular space between the stator bars 88 and solenoidal field coil 98 for maximum utilization of space within the machine.

In the rotor position shown in FIGS. 5 and 6, the magnetic flux generated in the rotor 76 by solenoidal field coil 98 follows a path through the set of teeth 79, downwardly through a tooth 78, across the air gap 100 and into projection 92, thence along the lower stator bar 88 (partly shown) to the laminated ear 96 and into the annular ring 94 connected thereto. In the ferromagnetic flux annular ring 94, the flux divides and flows generally upwardly around both arcuate halves of ring 94 into laminated ear 97 and upper stator bar 88, thence through projection 90, across air gap 102 into a tooth 78 of set 77 and through rotor 76 to thus complete the flux path. It will be apparent to those skilled in the art that upon rotation of the rotor 76 through an angle of 180° the magnetic flux in the annular ring 94 will then flow generally downwardly around both arcuate halves of the ring 94 thereby switching the direction of flux flow through the ring 94. By the well-known technique of appropriately shaping the rotor teeth 78 and stator bar projections 90,92, the voltage induced in the toroidally wound output coils 104 can be caused to vary essentially sinusoidally as the rotor 76 spins about its axis.

Twenty-four closely spaced solenoidal output coils 104 of flat copper strip are wound about each annular ring 94 to form a toroidal winding and are provided with output leads 106,108, The leads 106,108 extend radially between the stator bars 88 and are connected respectively to longitudinal buss bars 110, 112. Every other output coil 104 on each annular ring 94 is oppositely wound so that appropriate connection of the coils on each ring 94 yields two output voltages of 180° phase difference. Thus, the number of output phases available is equal to twice the number of rings 94, i.e. 30 phases for the machine of FIG. 5. Since the output coils 104 are tightly wound around the annular rings 94, ohmic losses are kept to a minimum.

As hereinabove described and illustrated in the accompanying drawings, the present invention provides a novel inductor alternator of compact construction which advantageously utilizes economical solenoidal and toroidal windings to minimize the flux leakage characteristics of the machine and the ohmic losses in both the field and output coils. In addition, the simple configuration of the laminations for the stator bars and annular rings reduces the cost of manufacturing the machine.

Many modifications and variations of the present invention are possible in light of the above teachings and within the purview of the appended claims without departing from the spirit and intended scope of the invention

What is claimed is:

1. An inductor alternator comprising:
   a rotor mounted for rotation about its axis, said rotor having two axially spaced radially extending toothed portions formed about the periphery thereof, each toothed portion including at least one tooth, each tooth of one of said portions having an associated tooth of the other portion oppositely disposed on the rotor periphery;
   means for generating a magnetic flux in said rotor;
   at least two elongated stator bars mounted concentrically of and parallel to said rotor axis, each of said stator bars being oppositely disposed of another of said stator bars to define an associated pair of stator bars, said stator bars being radially spaced from said rotor, each of said stator bars further having inwardly extending radial projections at the ends thereof, the ends of each of said projections confronting respectively one of said toothed portions on said rotor across a radial air gap;
   at least one ferromagnetic flux annular ring disposed coaxially of said rotor, said ring being magnetically coupled to and supported by an associated pair of oppositely disposed stator bars; and
   a plurality of solenoidal output coils wound radially about the cross-section of each annular ring;
   whereby upon energization of said magnetic flux generating means, rotation of said rotor through at least one revolution causes the magnetic flux in each annular ring to alternately switch direction to thereby induce an alternating voltage in said output coils.

2. An inductor alternator according to claim 1 wherein each annular ring is positioned in the space between said rotor and said stator bars and including a pair of laminated ears connecting said ring to each of said associated pair of oppositely disposed stator bars.

3. An inductor alternator according to claim 1 wherein said magnetic flux generating means includes a stationary solenoidal field coil coaxially surrounding said rotor in close proximity thereto.

4. An inductor alternator according to claim 2 wherein said solenoidal output coils are formed of flat copper strip wound closely adjacent to the surfaces of each annular ring to thereby minimize the ohmic losses of said coils.

5. An inductor alternator according to claim 1 wherein said solenoidal output coils are closely spaced to form a toroidal output winding.

* * * * *